Aug. 16, 1960  E. V. ASPENBERG  2,949,194
COUPLING DEVICE FOR WHEELED VEHICLES
Filed March 25, 1957  2 Sheets-Sheet 2
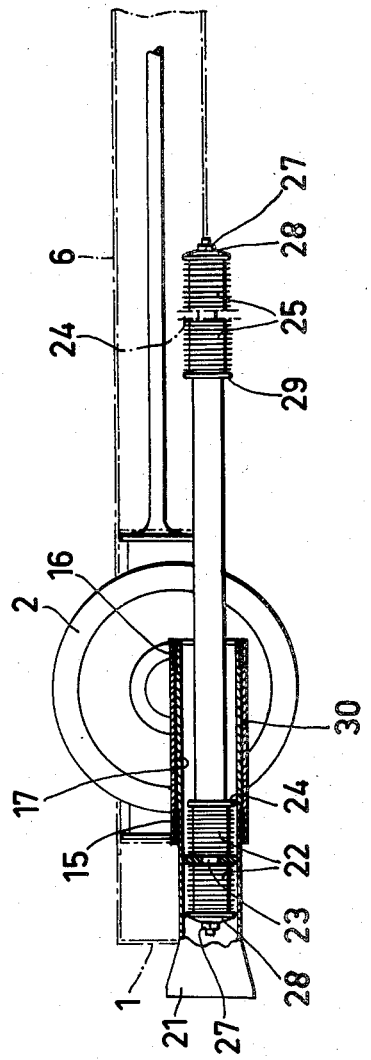
INVENTOR.
E. V. Aspenberg
BY
ATTYS.

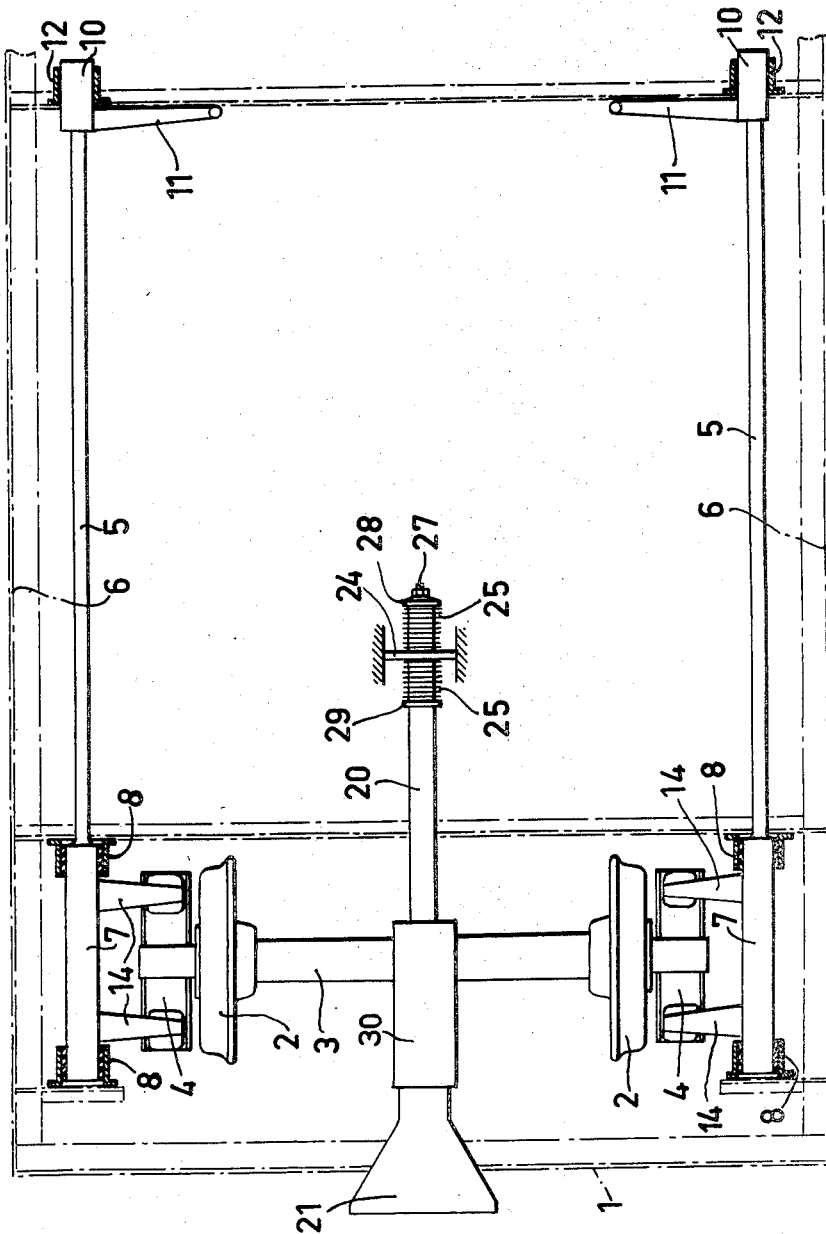

2,949,194

COUPLING DEVICE FOR WHEELED VEHICLES

Erik Vilhelm Aspenberg, Linkoping, Sweden, assignor to Aktiebolaget Svenska Järnvägsverkstäderna, Tannefers, Linkoping, Sweden, a Swedish joint-stock company Filed Mar. 25, 1957, Ser. No. 648,187

4 Claims. (Cl. 213—45)

The present invention relates to a coupling for wheeled vehicles, particularly railroad cars, and preferably between the running wheels or gears of two vehicles in order to prevent draft and buffing forces, which may be of considerable magnitude, from being transmitted to parts of the running wheel where they may cause great damage and inconvenience. The invention is substantially characterized in that the running gear has a central coupling equipped with a draw and push rod extending in the longitudinal direction of the vehicle, and with one end portion resiliently connected with a coupling head and with the other end resiliently anchored to the car body or the chassis. The invention is further characterized in that the necessary displacement between the axles is absorbed by journalled sleeves between the central coupling and a longitudinal sleeve mounted in the running gear.

An embodiment of the invention is illustrated in the accompanying drawing. Fig. 1 is a plan view of the running gear of a railroad vehicle, and Fig. 2 is a longitudinal section through the center of the running gear and in the longitudinal direction of the vehicle.

Reference numerals 1 and 6 designate the frame of the carriage or car body, 2 designates the wheels and 3 the axle for the wheels, said axle being mounted in two yokes 4, one at each end of the axle, numeral 5 designates two torsion springs, each being mounted along its respective frame beam 6. Each torsion spring has one end fixed to a shaft 7 which is pivotally mounted at 8. The other end of the torsion spring is mounted in a hub 10 or the like and is connected to a lever which can be locked in the position shown, said lever being utilized for adjustment of the floor height of the car. For this purpose the hub is pivotally mounted in a sleeve 12 attached to the frame beam 6. Reference numeral 14 designates arms or projections in the form of levers mounted on the shaft 7, which rest in points on both sides of the shaft on the yoke 4 with interjacent spring or rubber elements. These details may be changed without influencing the present invention, which will be hereinafter described.

The abovementioned draft and buffing forces are absorbed by a central coupling which is fixed to the running gear, the coupling head 21 of which contains coupling elements of suitable construction, preferably of the "tight lock" type. However, the forces do not enter the running gear but are absorbed by a draw and push rod 20. One end of the said rod is resiliently fixed in the rear portion of the central coupling, said rear portion being pivotal or rotatable in a guide or sleeve 30, at least to the extent required to compensate for unevenesses of the road bed, the guide being fixed to the axle 3 of the wheel. In this case the spring elements are rubber springs 22 (Fig. 2), one being applied in front of and the other one behind a transversely extending cross piece or support 23 in which a narrower part of the rod 20 is movable against the action of one rubber spring or the other one. The other end of the rod is in the same way mounted in the carriage or car body by means of a stop 24 in which the rod is movable in the same manner as the front end and against the action of two rubber springs 25. At both these bearing points the springs can be stretched by means of nuts 27, each engaging a washer 28. An opposite stop washer is designated by 29. As will be seen from the drawing the draft and buffing forces applied to the coupling head do not enter the running gear but are absorbed by the rod 20. That the coupling of another car is attached to the running gear or to the bogie is already known, and also that a draw and push rod is attached to the coupling. What is considered new and of considerable importance in this case is the combination of a device in which the coupling of the next car is attached directly to the running gear of the car or carriage or to the wheels, at the same time as the coupling is attached to a draw and push rod, the other end of which is anchored to the carriage body. The advantage gained is that no draft or buffing forces, which may be of considerable magnitude, are transmitted to the axles of the running gear, thereby increasing the strain thereon.

The coupling device has still another feature of great importance. A coupling sleeve, designated by 30, was mentioned above. At each end of the said sleeve there is a rubber ring 15, 16, which centers the cylindrical rear portion 17 of the central coupling, which rear portion may be fixed in a coupling head 21. This resilient bearing between the two sleeves has been made in order to allow the coupling to turn relative to the axle of the carriage. When two cars or carriages of this kind are coupled together this is carried out in such a manner that the two running gears of two adjacent carriage ends are coupled together by means of the central coupling, and the two connected running gears form a unit with the same function as a railway bogie with two axles. However, the rail is not quite smooth and therefore it will be necessary to allow some motion between the two axles. If one of the wheels should be lifted, it is evident that the other wheels must remain on the rail. In usual bogies, for example, this is arranged in such a manner that their bearing boxes run in vertical guides in a bogie framework. According to the present invention there is no such framework, but the said displacement is absorbed through the mobility of the bearing provided between the rear portion of the coupling and the sleeve 30.

What I claim is:

1. A wheeled support and coupling assemblage for a railroad car, comprising a non-rotatable axle, means to support a car resiliently on said axle, a pair of wheels rotatably supporting said axle, a guide fixedly mounted centrally of said axle between said wheels and extending generally longitudinally of said car, a coupling assemblage including a coupling element to extend beyond the adjacent end of said car, an extension rigidly secured to said coupling element received and supported by said guide, and a draw rod secured to said coupling assemblage at one end and resiliently secured to said car at the other end.

2. A device for coupling the adjacent pairs of rotatable wheels of two railroad cars and the like together, each of said railroad cars being supported at each end by a non-rotatable axle, a pair of rotatable wheels on each said axle, said device comprising a coupling assemblage including a coupling head and a rearwardly extending portion rigidly secured to said coupling head, a draft and push rod having one end supported by and secured to said rearwardly extending portion and extending in the longitudinal direction of said railroad car and having the other end of said draft and push rod being anchored to said railroad car, and guide means extending in said longitudinal direction fixedly secured to said axle and engaging said rearwardly extending portion of said coupling assemblage, said rearwardly extending portion being movable longitudinally and rotatably in the guide means.

3. A device according to claim 2, wherein said rearwardly extending portion of said coupling assemblage defines a cylindrical supporting sleeve provided with a transversely extending cross piece therewithin, resilient means disposed on opposite sides of said cross piece within said supporting sleeve, and stop elements carried by said draft and push rod engageable with said resilient means controlling displacement of the latter.

4. A device according to claim 3, wherein said supporting sleeve is mounted within said guide means, said guide means being provided with resilient inserts in the form of rubber rings for centering said supporting sleeve, whereby the required displacement between said axles when one wheel assumes a different level than the other wheel is absorbed by said resilient inserts, and any draft and buffing forces are simultaneously absorbed by said resilient means for said draw and push rod.

References Cited in the file of this patent

UNITED STATES PATENTS

| | | |
|---|---|---|
| 672,112 | Westinghouse | Apr. 16, 1901 |
| 1,420,183 | Davis | June 20, 1922 |
| 2,115,095 | Bugatti | Apr. 26, 1938 |
| 2,297,143 | Giaimo | Sept. 29, 1942 |
| 2,636,621 | Dean | Apr. 28, 1953 |

FOREIGN PATENTS

| | | |
|---|---|---|
| 1,098,691 | France | Jan. 25, 1954 |